(12) United States Patent
Shamanna (10) Patent No.: US 7,761,081 B2
(45) Date of Patent: Jul. 20, 2010

(54) SERVICE PROVISIONING

(75) Inventor: Ram Shamanna, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 625 days.

(21) Appl. No.: 11/311,854

(22) Filed: Dec. 19, 2005

(65) Prior Publication Data

US 2007/0142038 A1 Jun. 21, 2007

(51) Int. Cl.
*H04M 11/00* (2006.01)

(52) U.S. Cl. .................. 455/405; 455/406; 455/408; 379/144.01; 379/88.13

(58) Field of Classification Search .................. 455/405, 455/406, 408, 414.1; 379/144.01, 88.13; 709/203

See application file for complete search history.

(56) References Cited

U.S. PATENT DOCUMENTS

| | | | |
|---|---|---|---|
| 6,385,311 B1 * | 5/2002 | Bauer et al. | 379/201.02 |
| 6,424,706 B1 * | 7/2002 | Katz et al. | 379/144.01 |
| 6,438,601 B1 * | 8/2002 | Hardy | 709/229 |
| 6,515,989 B1 | 2/2003 | Rönneke | |
| 6,549,770 B1 | 4/2003 | Marran | |
| 6,564,055 B1 | 5/2003 | Hronek | |
| 6,625,258 B1 * | 9/2003 | Ram et al. | 379/88.13 |
| 6,658,455 B1 * | 12/2003 | Weinman, Jr. | 709/203 |
| 2005/0060363 A1 | 3/2005 | Jang et al. | |
| 2005/0090235 A1 | 4/2005 | Vermola et al. | |
| 2005/0165656 A1 | 7/2005 | Frederick et al. | |
| 2005/0277407 A1 * | 12/2005 | Ahn et al. | 455/414.1 |

FOREIGN PATENT DOCUMENTS

WO WO03050743 6/2003
WO WO2005109931 11/2005

OTHER PUBLICATIONS

International Searching Authority, International Search Report and Written Opinion of the Interantional Searching Authority, Jul. 19, 2007, 11 pages.

* cited by examiner

*Primary Examiner*—Danh C Le (57) ABSTRACT

Systems, methods, and devices are provided for providing dynamic service provisioning. One method embodiment includes initiating a request for a non subscription service that is provided by a wireless service provider, receiving the request to a subscription database, and providing an option to receive the non subscription service as a per use service.

21 Claims, 5 Drawing Sheets

SERVICE PROVISIONING

BACKGROUND

Wireless multifunction devices capable of both voice and data functions have proliferated in recent years. Certain wireless devices are capable of different network type connections. Examples of these different network types include the public switched telephony network (PSTN), mobile or wireless voice networks, e.g., public local mobile networks (PLMNs), IP networks, global system for mobile general packet radio service (GSM GPRS) networks, and public wireless local area networks (PwLANs), code division multiple access networks (CDMAs), etc. GPRS is an enhancement to the GSM mobile communications system that supports data packets. GPRS enables continuous flows of IP data packets over the system for such applications as Web browsing and file transfer, among others. Packet-based communications formats can also be utilized on 2+G, 2.5G, and 3G networks, such as Wideband-CDMA (W-CDMA), Universal Mobile Telecommunication System (UMTS), and Enhanced Data for Global Evolution (EDGE) networks, and the like, in addition to the above mentioned 2G networks. For example, an EDGE network is a network between 2G and 3G that enhances an existing GSM and GPRS implementation, thereby providing users with increased data rates. The EDGE network reuses the existing GSM/GPRS network components and cell plans but increases the data rates by increasing the data capacity of a GSM time slot by aggregating time slots together.

Communication service providers, e.g., Cingular, Verizon, Sprint-Nextel, Vodafone, etc., can provide various services to wireless device subscribers. These services include multimedia services such as email, video conferencing, music downloading, web browsing, and location based services, among others.

Service providers currently offer various services at flat monthly rates or as part of long term service contracts. Certain subscribers may choose not to subscribe to a given service because they cannot justify the cost for their prospective usage of the service and/or the cost itself may be prohibitive.

DETAILED DESCRIPTION

Subscribers to wireless services may from time to time wish to take advantage of some of the services to which they are not currently subscribed. However, these subscribers may find the cost of subscribing to a given service prohibitive, but may be willing to pay for one-off usage. That is, a subscriber may wish to use a service on an as-needed basis and be charged accordingly. Current methods of providing services to wireless subscribers do not take advantage of revenues available to be gained by using over the air service provisioning (OTASP) to allow subscribers to choose to receive currently unsubscribed services on an as-needed basis. The current methods also can cause customer dissatisfaction by not accommodating subscribers who would like to take advantage of a one-off usage without speaking with a customer service representative.

Embodiments of the present disclosure describe methods, devices, and systems for providing dynamic service provisioning in a wireless network. According to various embodiments, a method is described in which a wireless subscriber initiates a request for a wireless service provided by a wireless service provider. The request is received to a subscription database, and the subscriber receives an option to receive a non subscription service as a per use service. According to this method, a non subscription service can be provided to a wireless subscriber on a per use basis by using over the air service provisioning (OTASP). In this manner, a wireless subscriber may receive a one-off usage of a wireless service without contacting a customer service representative.

Embodiments of the present disclosure described herein can be performed by software and/or firmware (i.e., computer executable instructions), hardware, application modules, and the like, executable and/or resident on systems, ASICs, and devices shown herein or otherwise. The embodiments of the present disclosure are not limited to a particular operating environment or to instructions written in a particular programming language. Software, firmware, and/or processing modules, suitable for carrying out embodiments of the present disclosure, can be resident in one or more devices or locations. Processing modules can include separate modules connected together or several modules on an application specific integrated circuit (ASIC).

System Example

Figure 1:
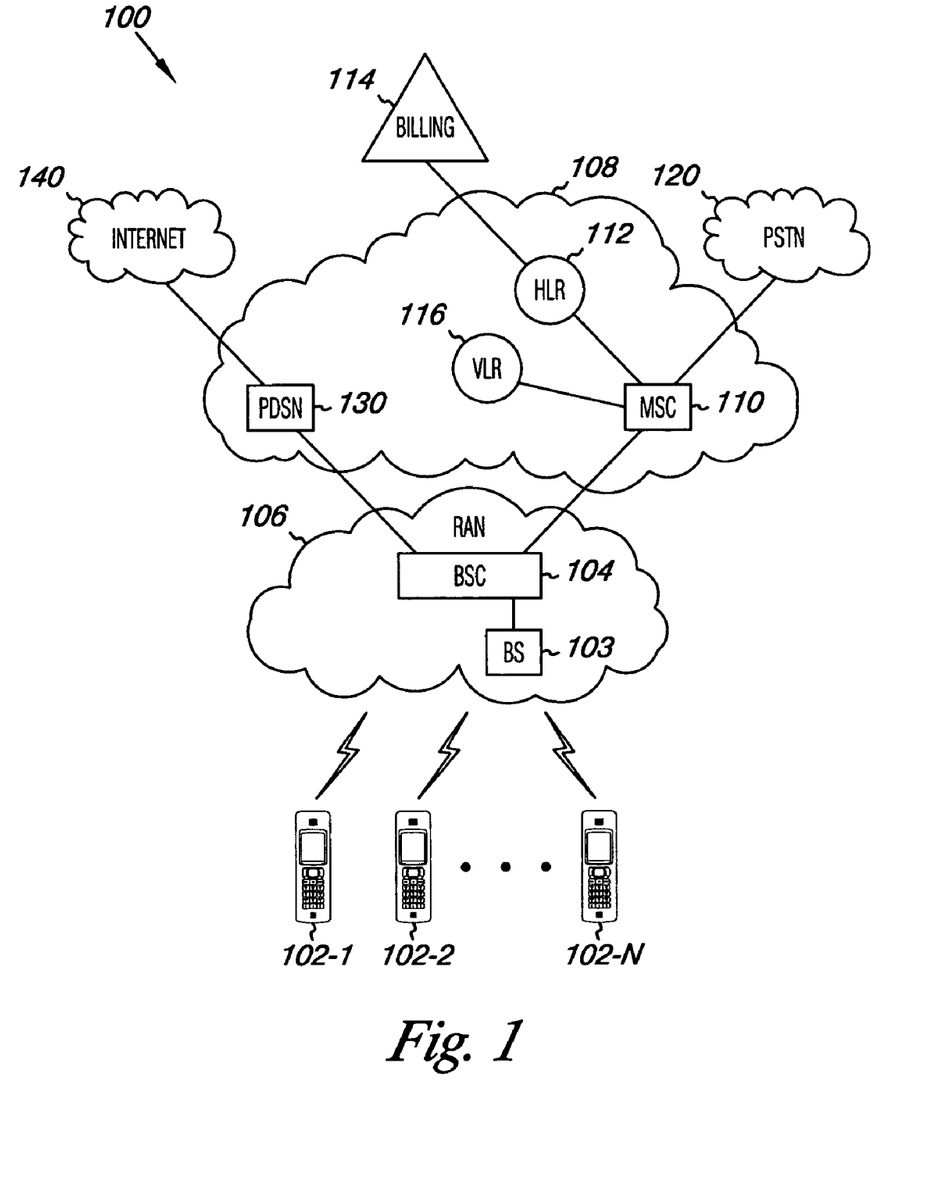
FIG. 1 is a block diagram of a communication system suitable to implement embodiments of the present disclosure.

FIG. 1 is a block diagram of a communication system suitable to implement embodiments of the present disclosure. FIG. 1 illustrates a wireless communication system 100, which can be operated by an industry wireless provider or operator, e.g., Cingular, Verizon, Sprint-Nextel, Vodafone, etc. Wireless communication system 100 also supports OTASP operations using appropriate over the air programming (OTAP) standards, e.g., IS-683, IS-725, etc. Wireless networks may include ANSI/IS-41 and GSM MAP types of networks. American national standards institute (ANSI) networks using code division multiple access (CDMA), time division multiple access (TDMA) or technologies of the like, as well as global systems for mobile (GSM) type networks, are known to those skilled in the art. Such wireless networks can provide cellular/PCS (personal communication service) services like call origination and call delivery, streaming data, text messaging, etc., for an appropriately enabled wireless device or handset 102-1, 102-2, . . . 102-N.

Wireless devices 102-1, 102-2, . . . , 102-N, e.g., mobile and portable, devices, can include a wireless network interface such as a wireless transceiver, wireless network interface card, etc. These wireless devices, 102-1, 102-2, . . . , 102-N can include wireless enabled personal digital assistants (PDAs), communication handsets such as multifunction phones, Blackberry devices, laptop computers, among others. Each of these wireless devices 102-1, 102-2, . . . , 102-N may have different features and function capabilities dependent upon a particular device type and applications provided thereon. That is, some devices may include features such as color displays and include application functionality that provides for instant messaging (IM), conferencing, streaming video, push to talk (PTT) capabilities, etc. Embodiments of the invention, however, are not limited to these examples.

As illustrated in the network embodiment of FIG. 1, wireless devices 102-1, 102-2, ..., 102-N can be communicatively coupled to a wireless network 108 that can support both packet-switched and circuit-switched services via a radio access network (RAN) 106. It is noted that while the RAN 106 embodied in FIG. 1 uses a CDMA2000 network architecture, embodiments of the present disclosure are not so limited, i.e., RAN 106 can include GSM or WCDMA network architectures including 2G, 2.5G, and 3G standards, among others. Wireless network 108 can in turn be coupled to public data networks (PDNs), e.g., the Internet 140, and/or to the PSTN 120.

The RAN 106 can include a base station controller (BSC) 104 and a plurality of base stations 103 that are dispersed throughout the geographic area serviced by a network. The base stations 103 can handle the radio protocols to communicate with, e.g., to transmit and receive signals, a wireless device 102-1, 102-2, ... 102-N. The BSC 104 communicates with one or more base stations 103 via an appropriate interface, e.g., the standard Abis interface for GSM, and can manage radio resources for one or more base stations. The BSC 104 also acts as the connection between wireless devices and the network 108, i.e., it can be coupled to a mobile switching center (MSC) 110 and/or a packet data serving node (PDSN) 130 or other network gateway component. A PDSN can serve as a gateway between a radio network and an IP network.

The wireless network 108 can include one or more mobile switching centers (MSCs) 110 which can be coupled to RAN 106. An MSC 110 is a telephone switch specialized for wireless and mobility support. An MSC 110 can perform various functions, including mobility management, call handoffs, call admission, call control, resource allocation, and so forth. A call and/or other data can be relayed from the MSC 110 to base stations 103 and to wireless devices 102-1, 102-2, ... 102-N via RAN 106. An MSC 110 can be coupled to various network entities including registers, e.g. home location register (HLR) 112 and visitor location register (VLR) 116, gateways, e.g., PDSN 130, etc. As one of ordinary skill in the art will appreciate, wireless network 108 can also include various other network components, e.g., a serving VLR, a serving MSC, routers, etc., to support mobile device "roaming". Roaming refers to the ability of a wireless device to move from one cell to another without losing connectivity.

An HLR is a database in a cellular system that contains all the subscribers within the provider's home service area and can be responsible for maintaining subscription information, e.g., in a subscription record. An HLR can include a memory and a processor capable of executing instructions storable on the memory. An HLR can maintain subscription information for both circuit-switched and packet-switched services. As will be discussed in greater detail herein, instructions on HLR 112 can be executed to perform various functions including authorization, data forwarding, etc.

As illustrated in the embodiment of FIG. 1, a billing function 114 can be associated with access to services over the various networks, e.g., 106 and 108. The billing function 114 can also include a memory and a processor capable of executing instructions storable on the memory. The billing function 114 may reside inside or outside of wireless network 108 and can communicate, via appropriate protocols, with various network components, e.g., the HLR 112, VLR 116, MSC 110, etc, in association with usage of services by the wireless devices 102-1, 102-2, ... 102-N. As will be discussed in further detail herein, instructions on the billing function 114 can be executed to relay billing information, activate services, and update the billing function upon fulfillment of a requested service.

Operational Examples

Figure 2A:
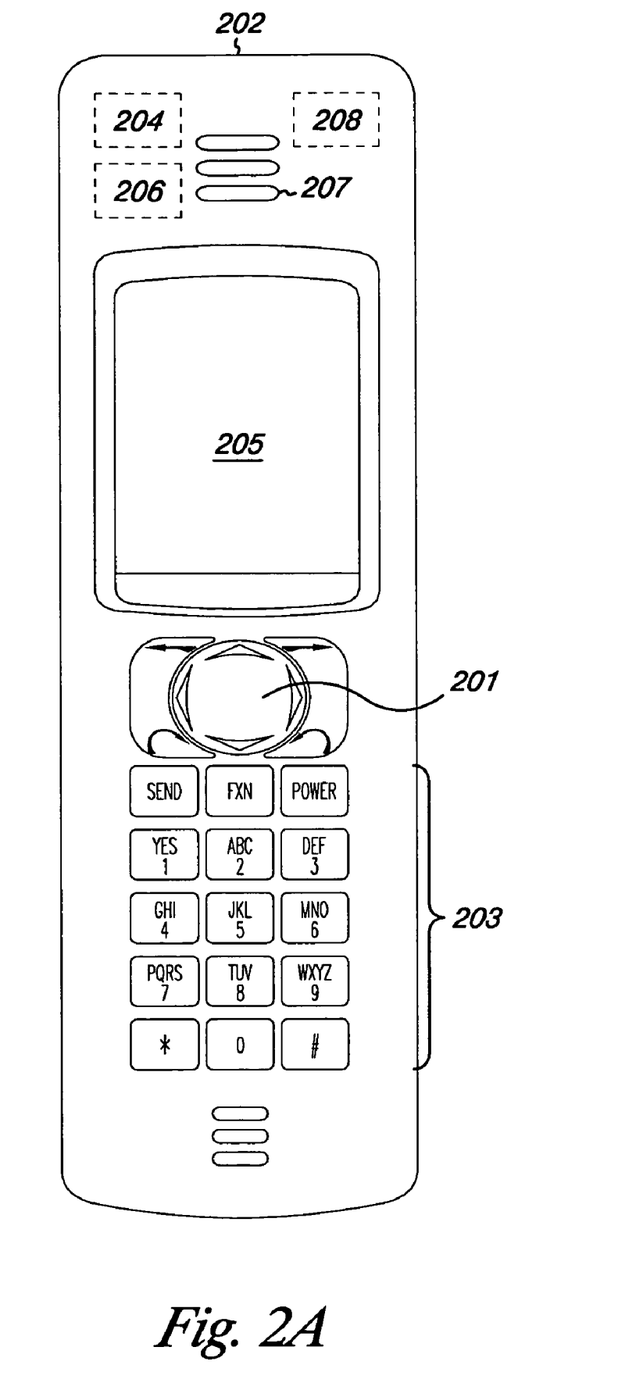
FIGS. 2A-2C illustrate an operational embodiment of a wireless device operable to receive dynamic service provisioning according to embodiments of the present disclosure.
Figure 2B:
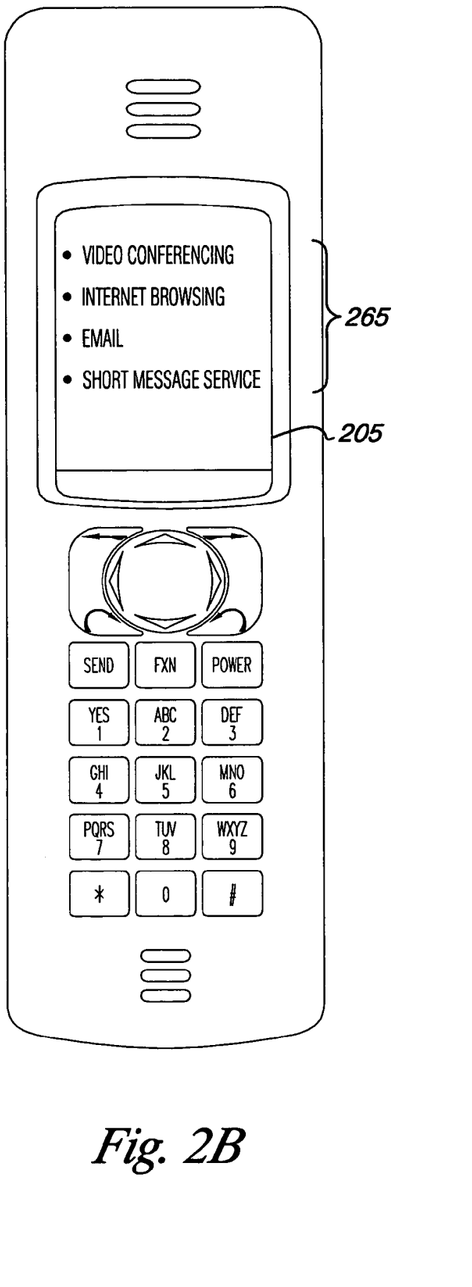
Figure 2C:
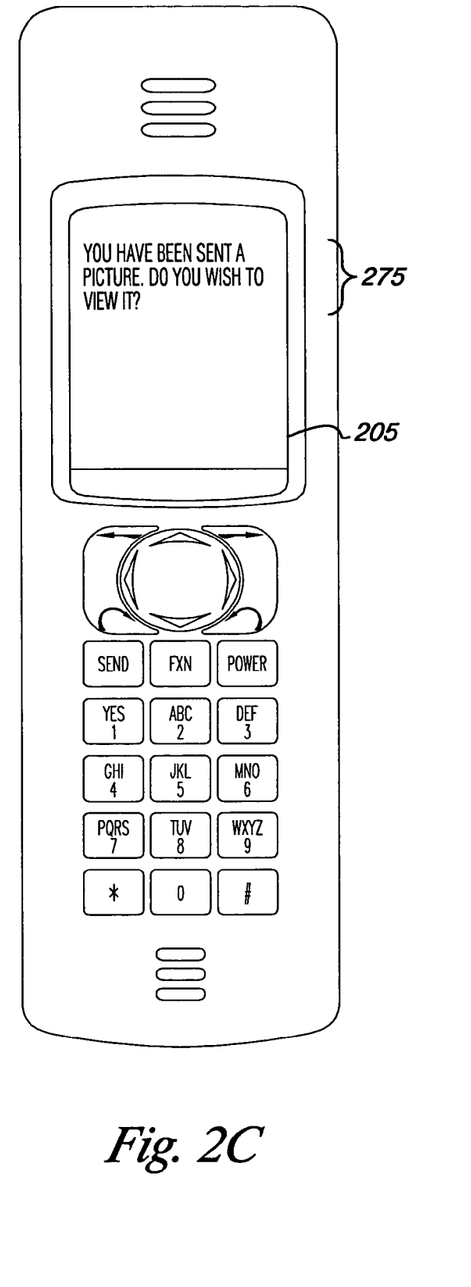
Figure 3A:
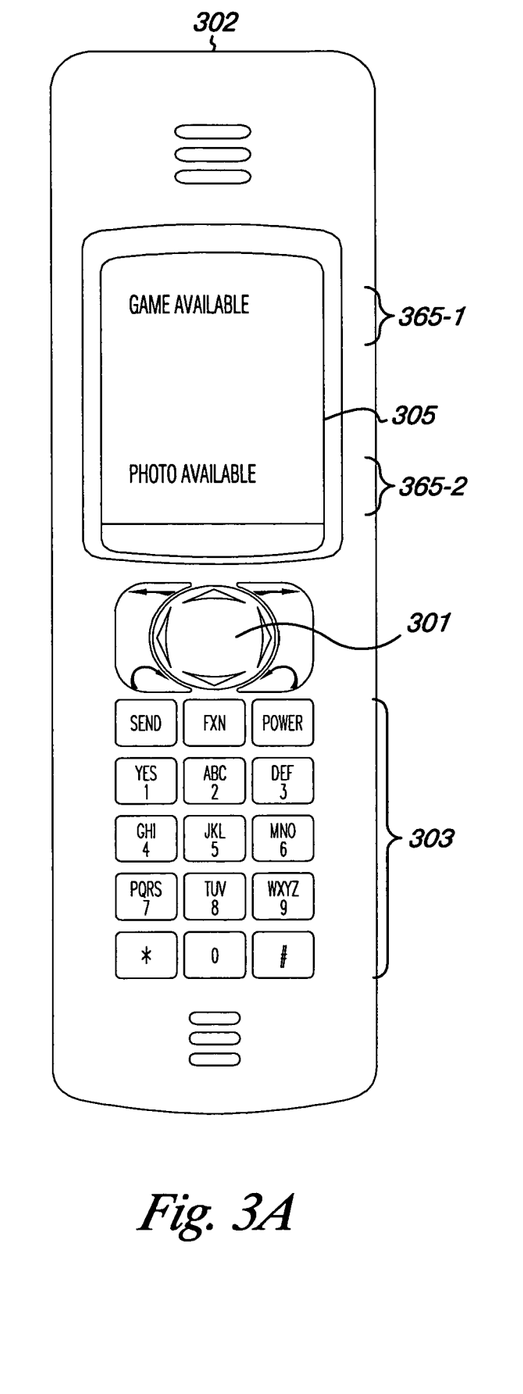
FIGS. 3A-3B illustrate an operational embodiment of a wireless device operable to receive dynamic service provisioning according to embodiments of the present disclosure.
Figure 3B:
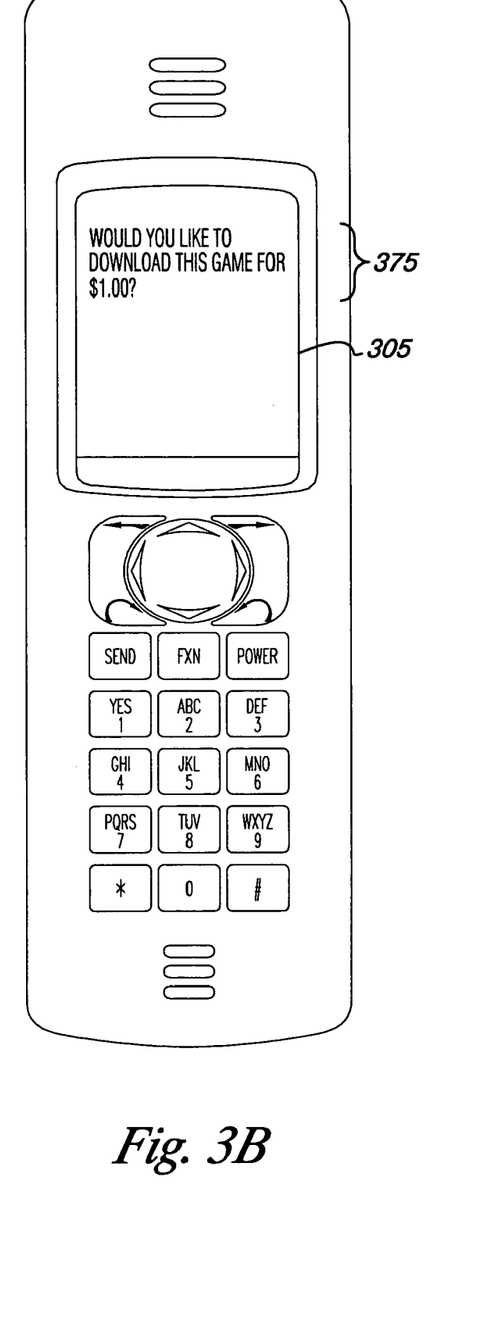

By way of example, and not by way of limitation, FIGS. 2A-2C illustrate an operational embodiment where a user can actively select a non subscription service and FIGS. 3A-3B illustrate an operational embodiment where a user can select a non subscription service based on a prompt which has been passively received, e.g., a wireless service offering received to the wireless device in an unsolicited manner. Embodiments are not limited to these operational examples.

FIGS. 2A-2C illustrate an operational embodiment of a wireless device 202 operable to receive dynamic service provisioning according to embodiments of the present disclosure. In FIG. 2A the wireless device is illustrated as a mobile phone 202. Embodiments, however, are not limited to this example. That is, the wireless device 202 could include various other wireless devices such as personal digital assistants (PDAs), MP3 players, handheld computers, pagers, handheld video game consoles, digital media players, digital cameras, and global positioning system (GPS) devices, etc., each having the ability to connect to a communication system such as the communication system 100 shown in FIG. 1.

As illustrated with reference to the mobile phone 202 in FIG. 2A, the mobile phone includes processor 204, memory 206, and transceiver 208 resources. The mobile phone 210 further includes a number of input keys 203, a toggle or softkey input 201, a display 205, and a speaker and microphone 207. The processor 204, memory 206, and transceiver 208 resources can communicate with and interact with the input keys 203, display 205, etc.

Instructions are storable in the memory 206 and executable by the processor 204 to perform various functions according to embodiments of the present disclosure. Memory 206 can additionally store various information, e.g., information relating to particular, available content as well as the content itself. For example, as will be described in more detail below, the memory 206 can store information that represents a number of dynamically provisionable non-subscription services that may be provided to the display 205. The memory 206 can store various audio and visual content associated with these services that may be provided to the display 205. The memory 206 of the mobile phone 202 can include an operating system such as J2ME stored in a read only memory (ROM). The memory 206 can also include random access memory (RAM), flash memory, etc. Thus, various memory 206 on the mobile phone 202 is available to store program instructions, routines, and applications.

In the operational sequence embodiment shown in FIG. 2B, the mobile phone 202 is illustrated displaying information 265 associated with receiving an unsubscribed service on a per use basis by using OTASP. In FIG. 2B, displayed information 265 includes a list of various services that can be provided by wireless service providers. Further, the display 205 shows four of these services, e.g., video conferencing, internet browsing, email, short message service (SMS). Embodiments, however, are not limited to these examples. Other example services include enhanced message services (EMSs) or multi media services (MMSs) including instant messaging (IM), push-to-talk (PTT), location-based services, etc.

The display 205 can include a touch-screen display and can be used in association with initiating a request for a non subscription service. The list that appears on display 205 can include both services to which a wireless subscriber is currently subscribed and those to which the subscriber is not currently subscribed. A wireless subscriber can select one of the services on display 205 by providing an input associated with an item on the list whether through touch-screen functionality, input keys 201 and 203, and/or voice input, etc. Embodiments are not limited to these example input means. In selecting a service from the list of services on display 205 to which the subscriber is not currently subscribed, program instructions provided to the mobile phone 202 can execute to initiate an OTASP message exchange (as described in more detail in connection with FIG. 4). One example message exchange embodiment is illustrated and discussed in connection with FIG. 4.

The operational example shown in FIG. 2C is intended to illustrate that a user of the mobile phone 202 could select a particular service, e.g., SMS service, to which the user is not subscribed from a list provided to the display 205 in FIG. 2B. According to embodiments, if the user of the mobile phone 202 is not subscribed to the selected service, program instructions can execute to prompt the user with text on the display 205 such as, "You have been sent a picture. Would you like to view it?" as shown by display information 275. If the user selected "yes," then program instructions can execute to send a request to receive the service as a per use service. As used herein, a per use service is a service that a wireless user can receive on a limited basis and for which the wireless user can be charged on a limited usage basis. For example, a wireless subscriber can receive a data download service as a per use service by being charged to download a single game, photo, etc. Another example is a wireless subscriber receiving an internet browsing service as a per use service by being charged to use the service for a limited time. Other examples include, but are not limited to, being charged per email sent or received or per email attachment sent or received, etc.

According to various embodiments the request can be transmitted to a wireless communication system, e.g., communication system 100 in FIG. 1, capable of delivering the per use service to the mobile phone 202. The user of the mobile phone 202 could then proceed to send an SMS message and be charged for the single use.

FIGS. 3A-3B illustrate an operational embodiment of a wireless device 302 operable to receive dynamic service provisioning according to embodiments of the present disclosure. In FIGS. 3A and 3B the wireless device is illustrated as a mobile phone 302. Embodiments, however, are not limited to this example. In FIG. 3A, the mobile phone 302 receives a message that a picture, a game, or other data service is available for access. Program instructions on the mobile phone 302 can execute to provide a prompt to the display inquiring whether a user wants to receive the data service on a per use basis.

In the operational sequence embodiment shown in FIG. 3A, the mobile phone 302 is illustrated displaying information 365-1 and 365-2 associated with receiving an unsubscribed service on a per use basis by using OTASP. FIG. 3A illustrates displayed information 365-1 and 365-2, i.e., information that a new game and a photo are available, respectively. The reader will appreciate that displayed information 365-1 and 365-2 could appear in forms other than text, e.g., as icons, etc. For example, some mobile device displays use an envelope icon to indicate that a user has a message available to be accessed.

A mobile device user may or may not subscribe to a service that allows games and/or photos to be downloaded. If the wireless device user is subscribed to the service, e.g., a game service, a picture message service, a photo viewing service, an email service with attachments, etc., then the user can initiate the desired service, e.g., by selecting the appropriate text, e.g., 365-1 or 365-2, by using input keys 301 and 303 or by selecting an appropriate icon, etc. However, if the mobile device user selects a text or icon associated with an unsubscribed service, i.e., the user attempts to access an unsubscribed service, then program instructions provided to the mobile phone 302 can execute to initiate an OTASP message exchange as described below in connection with FIG. 4. For example, in the embodiment of FIG. 3A, if an unsubscribed user selects "game available" as illustrated by display information 365-1, then program instructions on mobile phone 302 can execute to initiate an OTASP message exchange and to prompt a user with display information, e.g., display information 375 as shown in FIG. 3B.

The operational example shown in FIG. 3B is intended to illustrate that a user of the mobile phone 302 could select a particular service, e.g., a game downloading service, to which the user is not subscribed from a list provided to the display 305 in FIG. 3B. According to embodiments, if the user of the mobile phone 302 is not subscribed to the selected service, program instructions can execute to prompt the user with display information 375 such as, "Would you like to download this game for $1.00?" If the user selects "yes," then program instructions can execute to send a request to receive the service as a per use service. In this manner, a wireless device user can receive a non subscription service on an as-needed basis without interacting with a customer service representative.

Information Exchange Example

Figure 4:
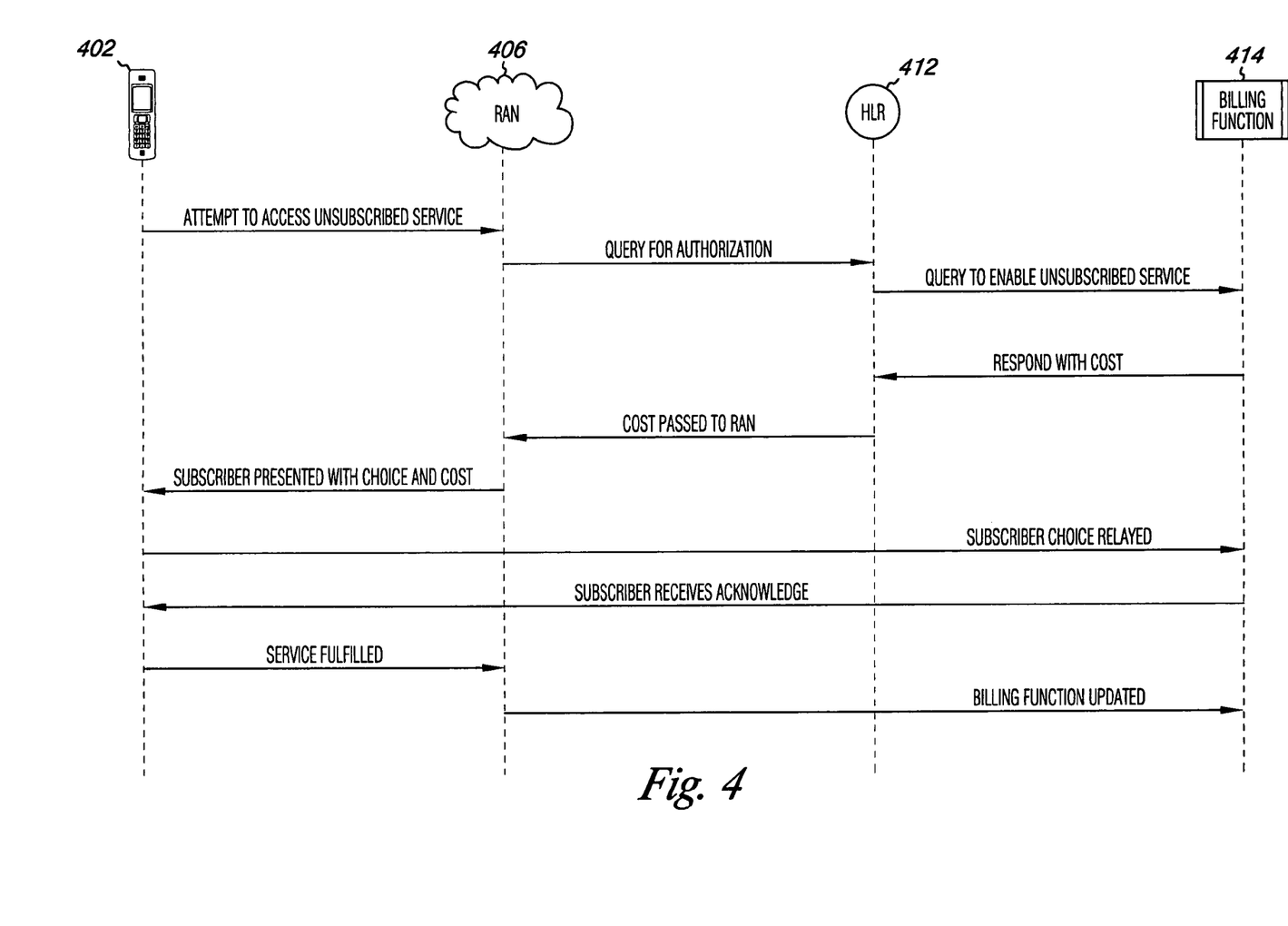
FIG. 4 is a call flow diagram illustrating an information exchange between network entities for providing an unsubscribed service as a per use service according to an embodiment of the present disclosure.

FIG. 4 is a call flow diagram illustrating an information exchange between network entities for providing an unsubscribed service as a per use service according to an embodiment of the present disclosure. In FIG. 4, a wireless device 402 is communicating with a home location register (HLR) 412 and a billing function 414 via radio access network (RAN) 406. The communication between the network entities can be performed using over the air service provisioning (OTASP) messages as are understood by those of ordinary skill in the art. In this manner, wireless devices can be provisioned with various services without a wireless subscriber having to bring the wireless device to a customer service center or having to speak with a customer service representative.

In the embodiment of FIG. 4, executable instructions on a wireless device 402 can execute to initiate a request for an unsubscribed service by a wireless subscriber attempting to access the unsubscribed service (shown as "attempt to access unsubscribed service"). As used herein, an unsubscribed service, or non subscription service, refers to a service that can be provided to wireless subscribers by a wireless service provider, but to which a particular subscriber is not currently subscribed. For example, a wireless subscriber may not subscribe to an internet browsing service that is offered by a service provider for various reasons, e.g., the service is costly and may be used infrequently by the subscriber, etc.

The request message is received by RAN 406 and executable instructions (on a base station 103 and/or BSC 104) can be executed to forward the request message to an HLR 412 via appropriate network elements in the form of a "query for authorization." Executable instructions on the HLR 412 can then be executed to determine that the requested service is one that is currently unsubscribed, e.g., by checking a list of subscription services stored on the HLR 412. Instructions on the HLR 412 can also be executed to update the subscriber record to allow for one-off usage of the requested service and query the billing function 414 to enable the non subscription service on a per use basis (shown as "query to enable unsubscribed service"). Executable instructions on the billing function 414 can then be executed to respond to the HLR query with a cost associated with receiving the particular non subscription service on a per use basis, e.g., "respond with cost." According to embodiments of the present disclosure, the cost associated with receiving a non subscription service as a per use service can depend on one or more factors including, the time of day, the amount of data to be received, the type of service requested, etc. For example, a service provider may desire to charge more for activating internet browsing, video conferencing, and email attachments on a per use basis during times of high network traffic, etc. Embodiments of the present disclosure are not limited to these examples.

Executable instructions on the billing function 414 can be executed to forward the cost associated with receiving the non subscription service to the wireless device 402, e.g., "respond with cost," via HLR 412, e.g., "cost passed to RAN" and RAN 406. According to embodiments of the present disclosure, instructions on the wireless device 402 can then be executed to present the wireless subscriber with information associated with receiving the particular non subscription service as a per use service (shown as "subscriber presented with choice and cost") as described in connection with FIGS. 2A-2C and 3A-3B. For example, the subscriber can be presented with a cost associated with receiving the non subscription service as a per use service in the form of a prompt. Instructions can also be executed to prompt the subscriber with an option to receive the non subscription service as a per use service, e.g., as described in connection with FIGS. 3A-3B. For example, the prompt could be presented to a subscriber on a display, e.g., display 305, and could include display information in the form of text such as, "Would you like to download this game for $1.00?" as shown by display information 375 in FIG. 3B. The prompt could include various other information such as the size of the data to be downloaded or a time limit associated with a particular service (e.g., a subscriber could pay to obtain a video conferencing service for one hour, etc.), among other information. As another example, the subscriber can be presented with an option such as, "Would you like to browse the internet for 10 minutes for a fee of $0.50, yes or no?"

The subscriber can then respond to the cost information displayed, e.g., "subscriber presented with choice and cost", on display 305 by actuating an appropriate key 303 and/or softkeys 301. For example, the subscriber could use a toggle or softkey 301 to toggle between "yes" and "no" options and then press an "enter" key, for example, to select the desired response. Executable instructions on the wireless device 402 can then be executed to forward the subscriber's choice, e.g., "subscriber choice relayed", to billing function 414. Executable instructions on the billing function 414 can be executed to relay an acknowledgment message to the subscriber that the particular requested service has been activated on a per use basis, e.g., "subscriber receives acknowledge". For example, the acknowledgement could appear as text on display, e.g., display 305, such as, "internet browsing activated," "email enabled," etc.

According to embodiments of the present disclosure, a request to receive a non subscription service as a per use service can be fulfilled using RAN 406, e.g., "service fulfilled." That is, executable instructions on the wireless device 402 can be executed to perform the requested service via RAN 406. For example, instructions on the wireless device 402 can be executed to download data from internet 140, or to send data to a remote location, e.g., to another wireless device located in another wireless network. Upon completion of fulfilling a request, executable instructions on the billing function 414 can be executed to update billing function 414. That is, instructions can be executed to charge the wireless subscriber the appropriate amount for the use of the non subscription service as a per use service, e.g., RAN 406 can send a message to the billing function 414 so the "billing function is updated."

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for providing service provisioning, comprising:
   receiving a message at a wireless device indicating that a non subscription service is available to the wireless device, wherein the non subscription service is a service offered by a wireless service provider as a subscription service to which the wireless device is not currently subscribed;
   initiating, using the wireless device, a request for the non subscription service to the wireless device;
   receiving the request to a subscription database; and
   providing an option at the wireless device to receive the non subscription service as a per use service, and be billed therefor.

2. The method of claim 1, wherein the method includes providing the non subscription service as the per use service.

3. The method of claim 2, wherein the method includes employing over the air service provisioning (OTASP) to provide the non subscription service as the per use service.

4. The method of claim 1, wherein providing an option to receive a non subscription service as a per use service includes providing an option to receive a service selected from the group including:
   a short message service (SMS);
   a multi media service (MMS); and
   an enhanced message service (EMS).

5. The method of claim 1, wherein providing an option to receive the non subscription service as the per use service includes providing a fee associated with the per use service.

6. The method of claim 1, wherein initiating the request for the non subscription service includes selecting the non subscription service from a list of non subscription services on a display of the wireless device.

7. The method of claim 1, wherein initiating the request for the non subscription service using the wireless device includes attempting to download data associated with the non subscription service.

8. The method of claim 1, wherein initiating the request for the non subscription service includes initiating a request for a non subscription service that is provided by the wireless service provider as part of a service plan.

9. The method of claim 1, wherein receiving a message at a wireless device indicating that a non subscription service is available to the wireless device comprises receiving the message at the wireless device in response to an attempt by the wireless device to access the non subscription service.

10. A computer readable medium having a program to cause a device to perform a method, comprising:
  in response to a message received at the device regarding one or more non subscription services available to the device, providing information to a display of the device indicative of the one or more non subscription services available to the device, wherein the one or more non subscription services are services offered by a service provider as a subscription service to which the device is not currently subscribed;
  automatically providing a prompt to the display of the device that provides an option to receive a particular one of the non subscription services to the device as a per use service when an attempt is made to initiate the particular non subscription service; and
  providing the particular non subscription service as a per use service if a selection is made to receive the particular non subscription service as a per use service by responding to the prompt, and be billed therefor.

11. The medium of claim 10, wherein the method includes using an OTASP message exchange to receive the message, to automatically provide the prompt and to provide the non subscription service.

12. The medium of claim 11, wherein providing the prompt to the display that provides the option includes indicating a fee associated with receiving the non subscription service as the per use service.

13. The medium of claim 12, wherein the method includes basing the fee on one or more factors selected from the group of factors including:
  a time of day;
  a amount of data to be received;
  an amount of data to be sent; and
  a type of non subscription service.

14. The medium of claim 10, wherein providing the non subscription service includes providing a non subscription service selected from the group including:
  a short message service (SMS);
  an enhanced message service (EMS); and
  a multi media service (MMS).

15. The medium of claim 10, wherein the method includes providing the non subscription service as a per use service without communicating with a customer service representative.

16. A system, comprising:
  a wireless network;
  a wireless device operating in the wireless network;
  means for providing a message to the wireless device indicative of one or more non subscription wireless services available to the wireless device, wherein the one or more non subscription services are services offered by a wireless service provider as a subscription service to which the wireless device is not currently subscribed;
  means for providing a cost of one-off usage of a selected non subscription wireless service of the one or more non subscription wireless services to the wireless device in response to a request for the selected non subscription wireless service; and
  means for providing one-off usage, and billing therefor, of the selected non subscription wireless service to the wireless device.

17. The system of claim 16, wherein the means include means for providing the one-off usage of the non subscription service without interacting with a customer service representative.

18. The system of claim 16, wherein the means includes executable instructions operable to provide a prompt to a display of the wireless device that provides an option for receiving the non subscription service as the per use service.

19. The system of claim 16, wherein the means includes executable instructions operable to initiate a request for the non subscription service based on a selection of the non subscription service from a list of non subscription services on a display of a wireless device.

20. The system of claim 16, wherein the means includes executable instructions operable to initiate a request for the non subscription service based on an attempt to receive data associated with the non subscription service.

21. The system of claim 16, wherein the means for providing a message to the wireless device indicative of one or more non subscription wireless services available to the wireless device is responsive to an attempt by the wireless device to access the non subscription service.

* * * * *

UNITED STATES PATENT AND TRADEMARK OFFICE
CERTIFICATE OF CORRECTION

PATENT NO. : 7,761,081 B2  Page 1 of 1
APPLICATION NO. : 11/311854
DATED : July 20, 2010
INVENTOR(S) : Ram M Shamanna It is certified that error appears in the above-identified patent and that said Letters Patent is hereby corrected as shown below:

On the Title page, in field (75), Inventors, in column 1, line 1, delete "Ram Shamanna, Plano, TX (US)" and insert -- Ram M Shamanna, Richardson, TX (US) --, therefor.

Signed and Sealed this
Twentieth Day of December, 2011

David J. Kappos
*Director of the United States Patent and Trademark Office*